United States Patent
Greenberg et al.

(10) Patent No.: US 12,143,345 B2
(45) Date of Patent: *Nov. 12, 2024

(54) METHODS AND SYSTEMS FOR CONFIGURING AN EMAIL ENGINE

(71) Applicant: salesforce.com, inc., San Francisco, CA (US)

(72) Inventors: Rebecca Greenberg, San Francisco, CA (US); David Louie, Palo Alto, CA (US); Mattia Padovani, San Francisco, CA (US); Darpan Dhamija, Santa Clara, CA (US)

(73) Assignee: Salesforce, Inc., San Francisco, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/049,401

(22) Filed: Oct. 25, 2022

(65) Prior Publication Data

US 2023/0147633 A1 May 11, 2023

Related U.S. Application Data

(63) Continuation of application No. 16/846,683, filed on Apr. 13, 2020, now Pat. No. 11,509,608.

(51) Int. Cl.
*H04L 51/02* (2022.01)
*G06Q 30/0241* (2023.01)
*H04L 51/23* (2022.01)
*G06F 40/186* (2020.01)

(52) U.S. Cl.
CPC ......... *H04L 51/02* (2013.01); *G06Q 30/0277* (2013.01); *H04L 51/23* (2022.05); *G06F 40/186* (2020.01)

(58) Field of Classification Search
CPC ...... H04L 51/02; H04L 51/23; G06Q 30/0277
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

Final Office Action mailed Feb. 24, 2021, in U.S. Appl. No. 16/846,683.

(Continued)

*Primary Examiner* — Hua Fan
(74) *Attorney, Agent, or Firm* — Weaver Austin Villeneuve & Sampson LLP

(57) ABSTRACT

Systems and methods for configuring an email engine associated with sequences of engagements are described. The email engine is associated with a first sequence of engagements and a second sequence of engagements. The email engine is configured to be activated based on completion of the first sequence of engagements. The email engine may be configured to generate and send an email to an email recipient based on a set of parameters unique to the email recipient and based on one or more government regulations. When the sending of the email is prevented because of the set of parameters or the government regulations, an error notification may be generated, and the second sequence of engagements may not be activated.

20 Claims, 10 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B2 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,509,608 B2 | 11/2022 | Greenberg et al. |
| 11,539,652 B2 | 12/2022 | Greenberg et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0200829 A1 | 9/2006 | Astl et al. |
| 2007/0130140 A1* | 6/2007 | Cytron .............. G06F 16/90344 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0070448 A1 | 3/2010 | Omoigui |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0170209 A1 | 6/2015 | Smith et al. |
| 2015/0172563 A1 | 6/2015 | Jakobson et al. |
| 2016/0267533 A1* | 9/2016 | Seth .................. G06Q 30/0255 |
| 2021/0320888 A1 | 10/2021 | Greenberg et al. |
| 2021/0320892 A1 | 10/2021 | Greenberg et al. |

OTHER PUBLICATIONS

Final Office Action mailed Jul. 12, 2021, in U.S. Appl. No. 16/846,683.

Final Office Action mailed Jun. 10, 2021, in U.S. Appl. No. 16/846,683.

"Google Plus Users", Google+Ripples, Oct. 31, 2011 [retrieved on Feb. 21, 2012 from Internet at http://www.googleplusers.com/google-ripples.html], 3 pages.

U.S. Notice of Allowance dated Aug. 31, 2022 in U.S. Appl. No. 16/947,212.

U.S. Corrected Notice of Allowance dated Jul. 27, 2022, in U.S. Appl. No. 16/846,683.

U.S. Non Final Office Action dated Dec. 7, 2021, in U.S. Appl. No. 16/846,683.

U.S. Non Final Office Action dated Feb. 24, 2022, in U.S. Appl. No. 16/947,212.

U.S. Notice of Allowance dated Jul. 18, 2022, in U.S. Appl. No. 16/846,683.

* cited by examiner

METHODS AND SYSTEMS FOR CONFIGURING AN EMAIL ENGINE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates generally to data processing and more specifically relates to email engine configuration.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art.

In general, a sales cadence is a sequence of activities that guides a salesperson to interact with a prospective client with the goal of converting the prospective client into an actual client. A sales cadence may be designed based on successful sales tactics to ensure repeatable success. For example, a sales tactic may include making two phone calls to a new prospective client seven days apart within a week and sending a marketing brochure immediately after the first phone call. Many of the operations included in a sales cadence are performed manually and may be prone to human error.

BRIEF DESCRIPTION OF THE DRAWINGS

The included drawings are for illustrative purposes and serve only to provide examples of possible structures and process operations for the disclosed techniques. These drawings in no way limit any changes in form and detail that may be made to implementations by one skilled in the art without departing from the spirit and scope of the disclosure.

DETAILED DESCRIPTION

Figure 1:
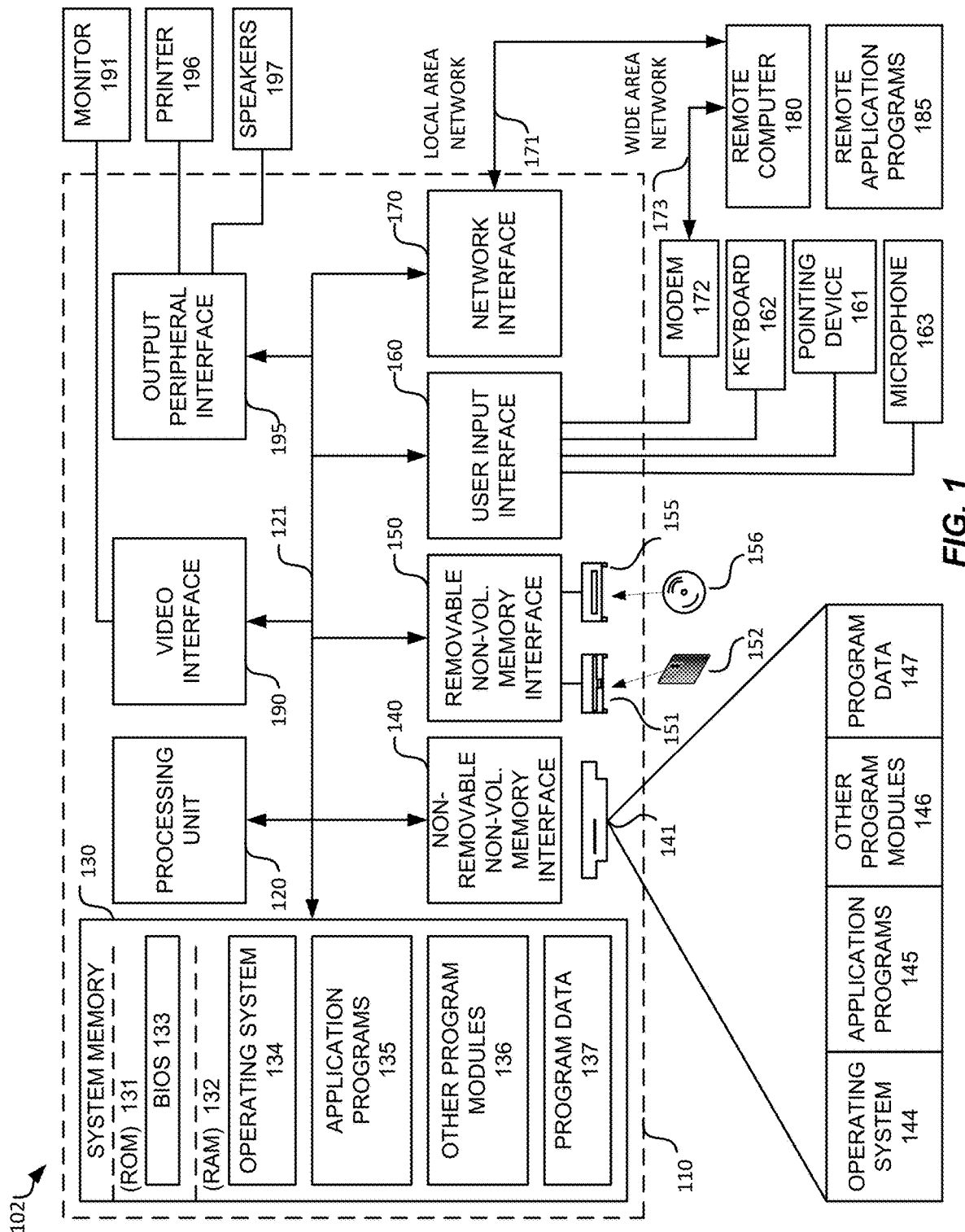
FIG. 1 shows a diagram of an example computing system that may be used with some implementations.

Examples of systems and methods associated with configuring an email engine to perform operations in a sales cadence will be described with reference to some implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, some implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed implementations may include a computer-implemented method for configuring a plurality of computer-implemented operations to be performed in relation to a sequence of engagements, the computer-implemented operations comprising a first one or more operations to precede an automatic email generation operation and a second one or more operations to follow the automatic email generation operation; and activating the automatic email generation operation based on detecting completion of all of the first one or more operations, the automatic email generation operation configured to generate and send emails to one or more email recipients based on a set of parameters and based on one or more government regulations, the second one or more operations configurable to be enabled based on detecting successful completion of the automatic email generation operation, and to be prevented based on detecting unsuccessful completion of the automatic email generation operation.

The disclosed implementations may include a system for automatically generating and sending emails associated with a sales cadence and may include one or more processors, and a non-transitory computer readable medium storing a plurality of instructions, which when executed, cause the one or more processors of a server computing system to configure a plurality of computer-implemented operations to be performed in relation to a sequence of engagements, the computer-implemented operations comprising a first one or more operations to precede an automatic email generation operation and a second one or more operations to follow the automatic email generation operation; and activate the automatic email generation operation based on detecting completion of all of the first one or more operations, the automatic email generation operation configured to generate and send emails to one or more email recipients based on a set of parameters and based on one or more government regulations, the second one or more operations configurable to be enabled based on detecting successful completion of the automatic email generation operation, and to be prevented based on detecting unsuccessful completion of the automatic email generation operation.

The disclosed implementations may include a computer program product comprising computer-readable program code to be executed by one or more processors of a server computing system when retrieved from a non-transitory computer-readable medium, the program code including instructions to configure a plurality of computer-implemented operations to be performed in relation to a sequence of engagements, the computer-implemented operations comprising a first one or more operations to precede an automatic email generation operation and a second one or more operations to follow the automatic email generation operation; and activate the automatic email generation operation based on detecting completion of all of the first one or more operations, the automatic email generation operation configured to generate and send emails to one or more email recipients based on a set of parameters and based on one or more government regulations, the second one or more operations configurable to be enabled based on detecting successful completion of the automatic email generation operation, and to be prevented based on detecting unsuccessful completion of the automatic email generation operation.

While one or more implementations and techniques are described with reference to automatically generating and sending emails associated with a sales cadence implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the claimed subject matter. Further, some implementations may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. For example, the migrated data may be stored in a source control system and then exposed through a virtual file system.

Any of the above implementations may be used alone or together with one another in any combination. The one or more implementations encompassed within this specification may also include examples that are only partially mentioned or alluded to or are not mentioned or alluded to at all in this brief summary or in the abstract. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, sales cadences may be used to guide salespersons through a prospecting process that may include, for example, when to call a prospect, when to send an email to a prospect, how long to wait before making another contact, etc. A salesperson may follow a phone script when making a call. A salesperson may use an email template when sending an email. Each operation in a sales cadence may yield one of several different outcomes, and there may be a different phone script or email template that can be used for each outcome. When an operation in a sales cadence involves sending an email, the salesperson may need to pay close attention to email settings in order to ensure that an email is sent successfully while following various email restrictions and requirements.

(Note to Inventors: Paragraphs in Tan are Boilerplates.)

FIG. 1 is a diagram of an example computing system that may be used with some implementations. In diagram 102, computing system 110 may be used by a user to establish a connection with a server computing system. For example, the user may be a salesperson associated with an organization and may be responsible for business development by engaging prospective clients using sales cadences.

The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, California or an operating system (e.g., Android) that is developed by Google Inc. of Mountain View, California.

Some implementations may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some implementations may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 110. The logical connections depicted in FIG. 1 include a local area network (LAN) 171 and a wide area network (WAN) 173 but may also include other networks. Such networking environments are commonplace in offices, enterprise-wide computer networks, intranets and the Internet.

FIG. 1 includes a local area network (LAN) 171 and a wide area network (WAN) 173 but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some implementations may be carried out on a computing system such as that described with respect to FIG. 1. However, some implementations may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
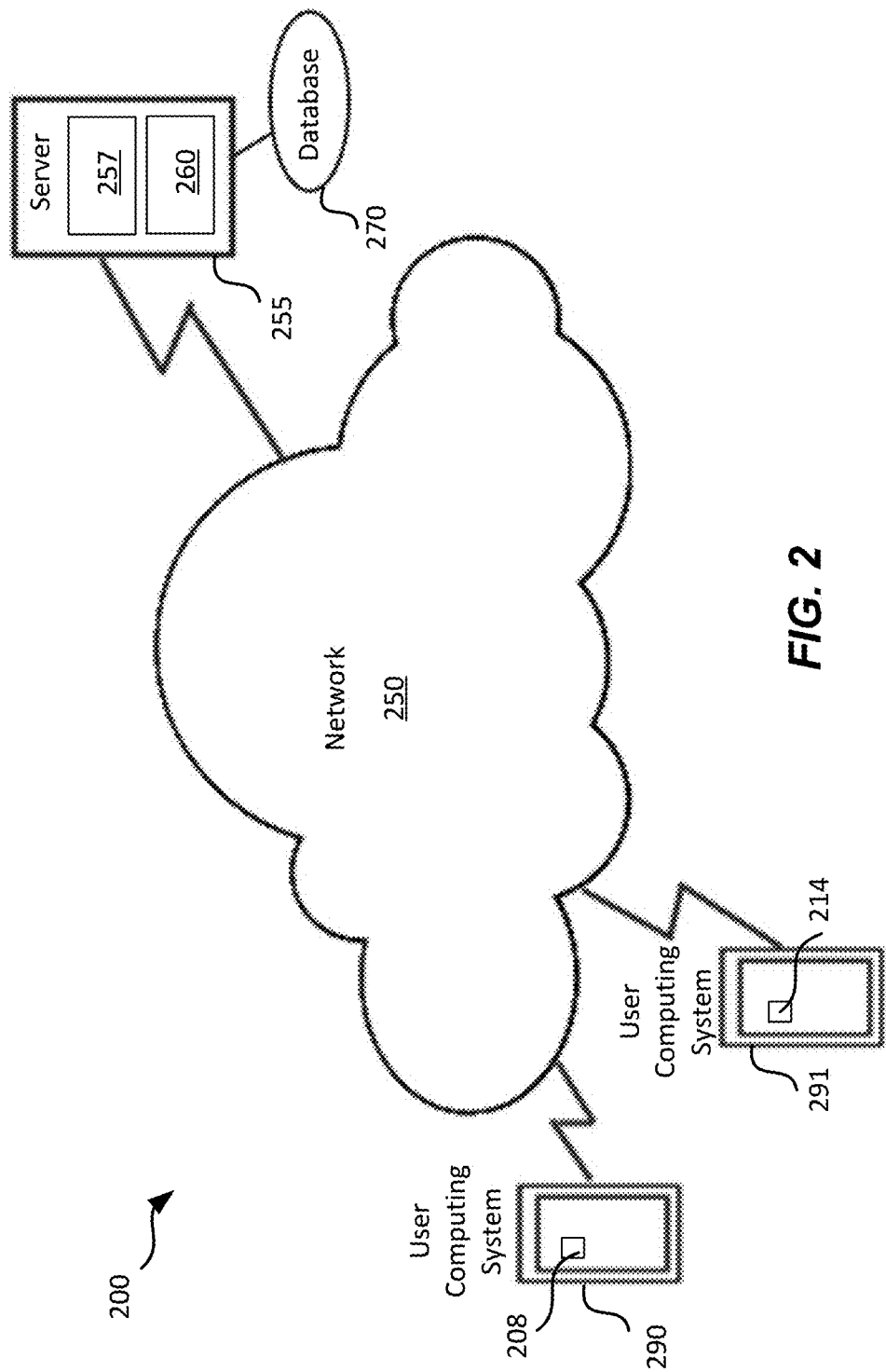
FIG. 2 shows a diagram of an example network environment that may be used with some implementations.

FIG. 2 shows a diagram of an example network environment that may be used with some implementations. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 via the network 250. The server computing system 255 may be coupled with database 270.

Each of the computing systems 290 and 291 may include an application module such as module 208 or 214. For example, a user may use the computing system 290 and the application module 208 to connect to and communicate with the server computing system 255 and log into application 257 (e.g., a Salesforce.com® application).

For some implementations, one of the computing systems 290 and 291 may be used by a salesperson to connect with a prospective client using a sales cadence. The sales cadence may be managed and controlled by the server computing system 255. An email engine associated with the sales cadence may be configured to execute with the server computing system 255. The sales cadence and information about the prospective client may be stored in the database 270.

Figure 3:
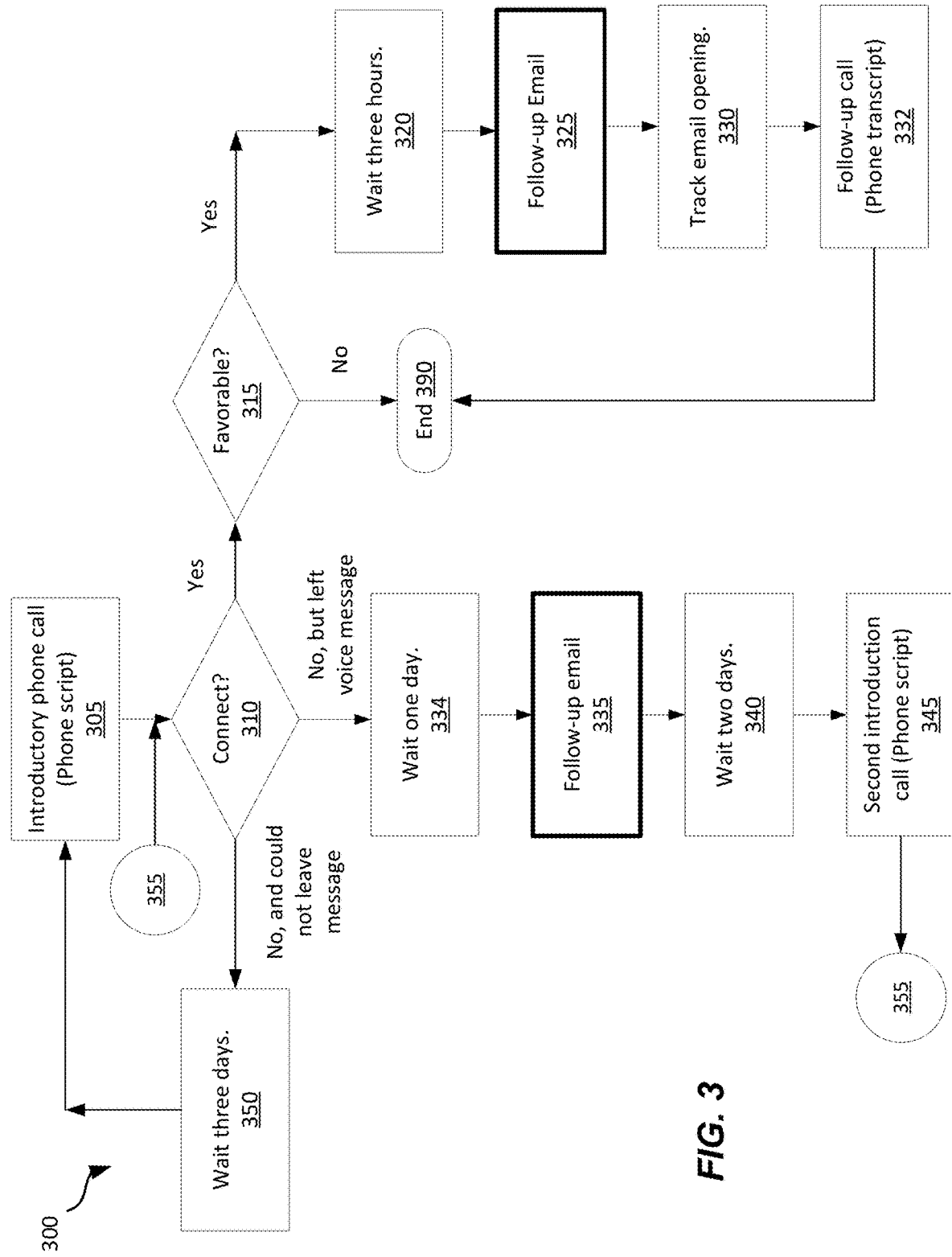
FIG. 3 shows an example flow diagram that includes a sales cadence, in accordance with some implementations.

FIG. 3 shows an example flow diagram that includes a sales cadence, in accordance with some implementations. Diagram 300 may include an abbreviated sales cadence example that enables a salesperson to connect with a prospective client. The sales cadence may include one or more sequences of operations (also referred to as sequences of engagements). Highlighted block 325 shows a follow-up email operation to be performed by the salesperson using an email template. The email operation of block 325 may be performed only if the previous operations have been completed. In this example, the previous operations include making an introductory phone call using a phone script (block 305), confirming that the call was connected (block 310) and the result was favorable (block 315), and waiting for three hours (block 320) before sending the follow-up email using an email template. After the email operation of block 325 is completed, then the track email operation (block 330) and follow-up call (block 332) may be performed by the salesperson.

Similarly, highlighted block 335 shows a follow-up email operation to be performed by the salesperson using an email template. The email operation of block 335 may be performed only if the previous operations at blocks 305, 310 and 334 have been completed, and only when the operation of block 335 is completed may the operations at blocks 340, 345 and 355 be performed. It may be noted that, even though the operations of blocks 325 and 335 are related to sending follow-up emails, the contexts of where in the sales cadence these operations occur may be different. The other operations at blocks 350 and 390 may be parts of the sales cadence but may only be tangentially related to the email operations of blocks 325 and 335. Traditionally, many of the operations in a sales cadence, including the email operations of blocks 325 and 335, are performed manually. For example, a salesperson may have to manually check to determine if it is time to perform the send email operations of block 325 or 335. Referring to block 325, to send an email, a salesperson may use an email template. For example, a user interface may include a dropdown menu showing available email templates, and the salesperson may need to select an approximate email template that is consistent with the context of the sales cadence. It may be noted that the sequence of operations associated with the sales cadence shown in diagram 300, including the related user interfaces, may be controlled and performed by a computer system such as, for example, the server computing system 255 (shown in FIG. 2).

Figure 4:
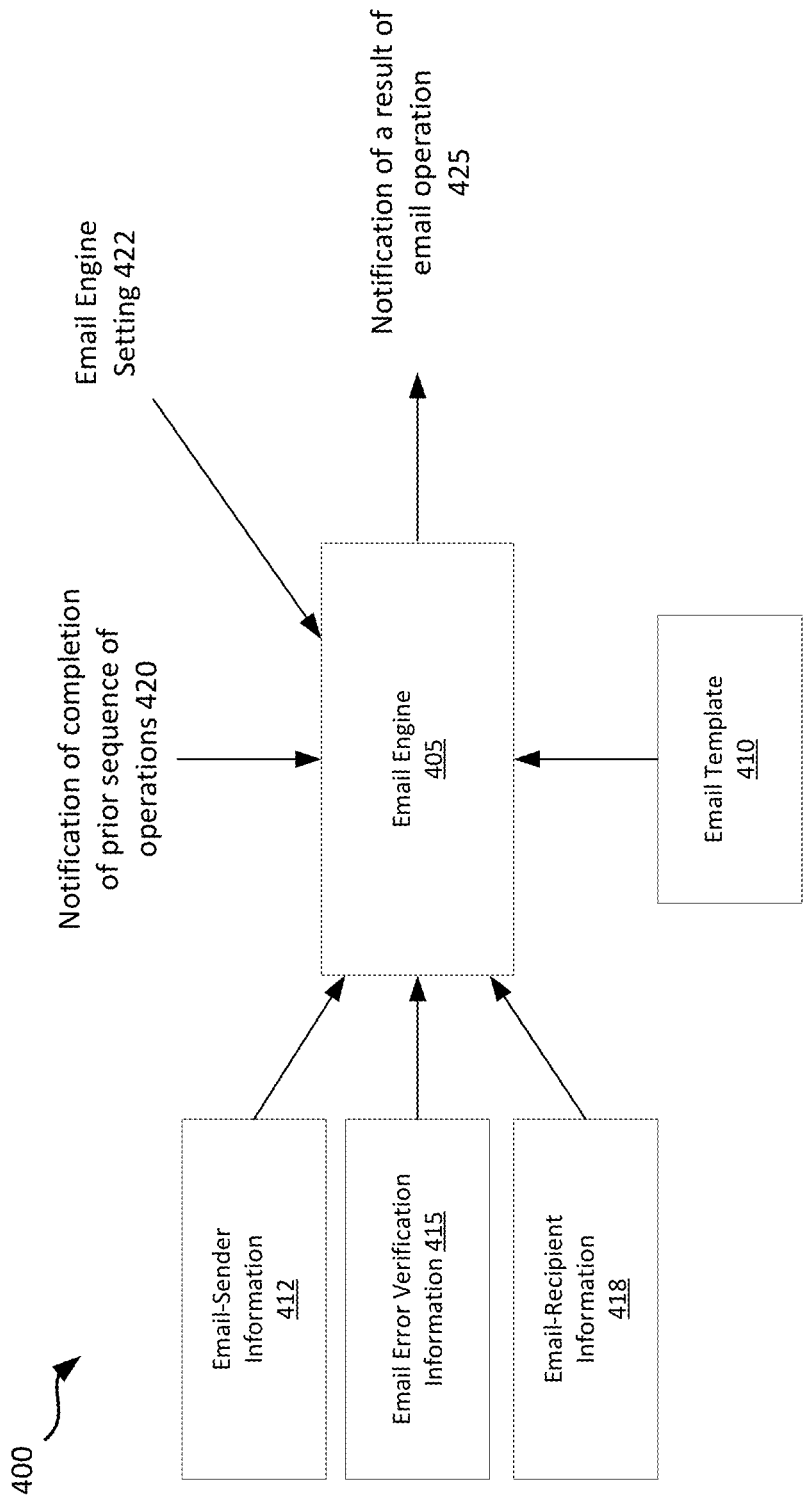
FIG. 4 shows an example email engine that may be configured to operate with a sales cadence, in accordance with some implementations.

FIG. 4 shows an example email engine that may be configured to operate with a sales cadence, in accordance with some implementations. Diagram 400 may include email engine 405 configured to generate and send emails automatically as an operation of a sales cadence. For some implementations, the email engine 405 may be associated with a customer relationship management (CRM) platform operated in a multi-tenant environment. An example of a CRM platform is Salesforce CRM of salesforce.com,inc., which offers a cloud-based on-demand CRM suite offering applications for various sized organizations, with a focus on sales and support.

The email engine 405 may be hosted by a server computing system (e.g., server computing system 255 shown in FIG. 2). For some implementations, the email engine 405 may be activated based on the email engine setting 422. For example, the email engine setting 422 may be used as a toggle on-off preference such that when the email engine setting 422 is set to "on", the email engine 405 may be activated, and when the email engine setting 422 is set to "off", the email engine may not be activated. The server computing system 255 may validate the email engine setting 422 before activating it. It may be possible that when the email engine setting 422 is off, the sales cadence may require engagement by the salesperson. For example, the salesperson may modify the email engine setting 422 or may cause an email to be sent using another method.

For some implementations, when the email engine setting 422 is set to a setting that may enable the email engine 405 to be activated, the email engine 405 may still need to receive notification of completion of prior sales cadence operations 420 to be activated. For example, the completion of the prior sales cadence operations may include completion of the operations shown in blocks 305, 310, 315 and 320 of FIG. 3. For some implementations, the email engine 405 may be configured to perform the email operation for one or more sales cadence and for one prospective client at a time. Performing the email operation may include generating an email and sending the email.

For some implementations, the email engine 405 may be configured to receive an email template 410. Generally, the email template 410 may be generated by an administrator or a sales manager and may be used by one or more salespersons who are associated with the same sales cadence such as, for the example, the sales cadence shown in FIG. 3. An email template interface may be used to generate the email template 410. For example, the email template user interface may include an option to specify an overall layout such as text email template or Hypertext Markup Language (HTML) email template. The email template user interface may also include an option to enter a content or body of the email and an option to add an attachment.

There may be merge fields in the email template. The merge fields may act as placeholder fields and may be replaced with actual values. Different email templates may be used for different situations depending on the context of the sales cadence when the email engine 405 is activated. For example, referring to FIG. 3, when the email engine 405 is activated based on the completion of the operation shown in block 320, one email template may be used. However, when the email engine 405 is activated based on the completion of the operation shown in block 334, a different email template may be used. Using the email template 410, the email engine 405 may be able to send an email containing attachments, letterheads and rich content.

The email engine 405 may be configured to receive email-recipient information 418. In this example, the email recipient is a prospective client. The email-recipient information 418 may be used by the email engine 405 to identify a contact record associated with the email recipient and to retrieve information about the email recipient from the contact record. The information retrieved from the contact record may be used to replace one or more merge fields in the email template 410.

The email engine 405 may be configured to receive email-sender information 412. In this example, the email sender is the salesperson. The email engine 405 may be configured to operate with different email services. For some implementations, the email engine 405 may use the email-sender information 412 to determine which of the email services to use to send an email on behalf of the email sender. For example, the different email services may include Gmail by Google LLC of Mountain View, California, Office 365 by Microsoft Corporation of Redmond, Washington, Exchange by Microsoft Corporation, and the email services provided by the CRM (e.g., Salesforce.com email service). Depending on the email services that the email sender is associated with and depending on their status, an appropriate email action may be selected.

Table 1 shows an example of possible email services associated with a salesperson, and how the email engine 405 may be configured to select an email service to send an email to a prospective client on behalf of a salesperson.

TABLE 1

| Salesperson's Email Account Status | Send Email Action |
|---|---|
| Salesperson has email account Inbox off + Einstein Activity Center (EAC) off + External email off | Send email using salesperson's CRM email account. |
| Salesperson has email account Inbox off + EAC off + External email on + Gmail Connected | Send email using salesperson's Gmail account. |
| Salesperson has email account Inbox off + EAC off + External email on + Office 365 Connected | Send email using salesperson's Office 365 email account |
| Salesperson has email account Inbox on + Office 365 or Gmail connected | Send email using Office 365 or Gmail account |
| Salesperson has one connected account through EAC Connected Account | Send email using Gmail or Office 365 |

In the example shown in Table 1, the EAC is a feature that is included in several products of Salesforce.com. The EAC may enable emails and events sent and received to be automatically added to the activity timeline of related account, contact, contract, lead, opportunity, and quote records. For example, the EAC may capture email and events from Microsoft or Google account and adds them to the activity timeline of related records such as Salesforce records. This may eliminate the need to manually log activities. Contact data may also be captured by the EAC and used to create email insights.

For some implementations, the email engine 405 may be configured to verify potential points of failure prior to sending an email. The potential points of failure may be included in the email error verification information 415. For example, the email error verification information 415 may include a check list of potential email errors such as unable to locate an email address for the email recipient, unable to use an email template because the email template is private, and unable to send an email because the email sender has exceeded an email sending limit. When the email engine 405 determines violation of one or more of the potential errors, the sending of the email may be prevented. Although not included in the example, other potential points of failure may also be considered by the email engine 405. The potential points of failure may be referred to as a set of parameters that the email engine 405 may need to verify. The set of parameters may be unique to each email recipient.

For some implementations, the email engine 405 may be configured to generate a notification of a result of the email operation 425. The notification may indicate that the email operation has succeeded, or it may indicate that the email operation has failed. For example, when the email engine 405 detects that it is unable to locate the email address of the email recipient or the email sender has exceeded an email sending limit, the email engine 405 may not send the email and may indicate an error in the notification of the result of the email operation 425. The notification of a result of the email operation 425 may be displayed via a user interface associated with the email engine 405. When there is a notification of an error, the email engine 405 may be placed in an error recovery mode until the error is corrected. Correction of the error may require action by the email sender or an administrator.

Figure 5:
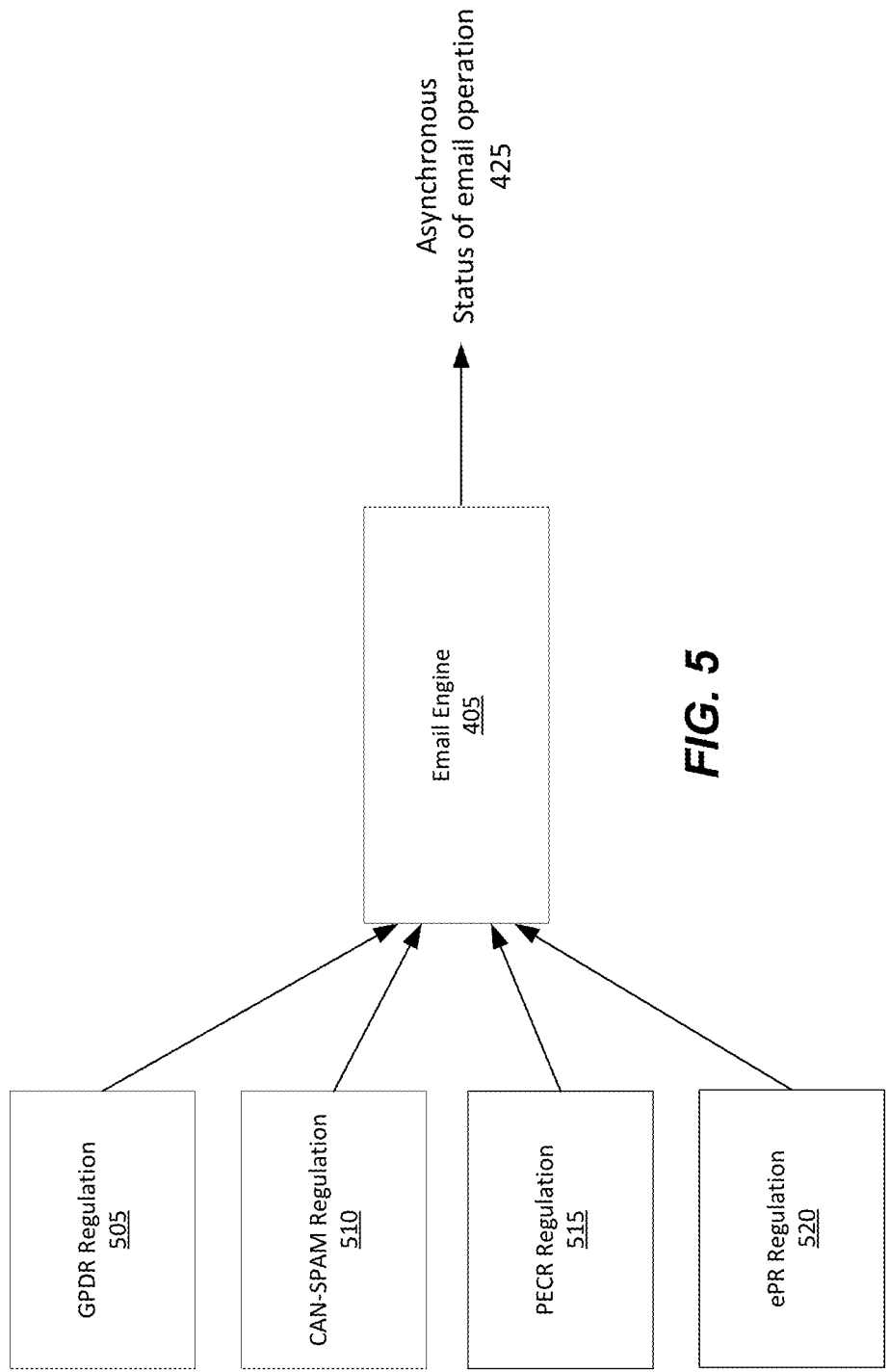
FIG. 5 shows an example email engine that may be configured to comply with government regulations, in accordance with some implementations.

FIG. 5 shows an example email engine that may be configured to comply with government regulations, in accordance with some implementations. Diagram 500 includes email engine 405 configured to generate and send emails while staying in compliance with government regulations with respect to emailing. For some implementations, the email engine 405 may be configured to follow the General Data Protection Regulation (GDPR) regulation 505 of the European Union, the Controlling the Assault of Non-Solicited Pornography And Marketing (CAN-SPAM) regulation 510 of the US, the Privacy and Electronic Communications Regulation (PECR) of the UK 515, and other government regulation relating to emailing such as ePrivacy (ePR) Regulation 520 of the European Union. The GDPR regulation 505 may include requirements affecting sending commercial emails such as, for example, requirement for consent from the email recipient, non-deceptive or misleading subject lines, placement of commercial content in the body of the email, timely processing of unsub scribing request, etc. The CAN-SPAM regulation 510 may include any electronic mail message the primary purpose of which is the commercial advertisement or promotion of a commercial product or service including email that promotes content on commercial websites. The emails need to keep the sender's location, email header and subject line honest, admit that the email is an advertisement, including an easy option for opt-out and timely processing of opt-out, etc. The PECR 515 may include requirements such as unambiguous and affirmative consent, etc. The ePR 520 is a proposal for greater regulation of electronic communications within the European Union, in order to increase privacy for individuals and entities, and may replace GDPR. The regulations 505-520 may be referred to collectively as government regulations.

For some implementations, the email engine 405 may be configured to detect whether any government regulation is applicable to the sending of an email and perform precautionary operations to enable staying in compliance prior to sending an email. This may include regulations concerning privacy and data protection. When the email engine 405 detects violation of one or more of the government regulations, the sending of the email may be prevented. The email engine 405 may be configured to detect for one or more of no contact preference, no tracking preference and no subscription preference and may cause the sending of the email to fail. The no contact preference, no tracking preference and no subscription preference may be stored in a contact record associated with the email recipient.

For some implementations, the email engine 405 may be configured to evaluate the content of the email including, for example, searching for keywords that may trigger identifying the email to be commercial in nature and cause the sending of the email to fail to comply with the CAN-SPAM regulation 510. As described above, when the email engine 405 determines not to send an email, it may be placed in a recovery mode enabling corrections to be performed to the email for subsequent sending.

For some implementations, when the email engine 405 prevents the email from being sent, the sales cadence that the email engine 405 is associated with may stop until all errors are corrected. Referring to FIG. 3, when the email engine 405 is configured to perform the operations of block 325 and the sending of the email is stopped, all operations subsequent to block 325 may not be performed.

For some implementation, the email engine 405 may be configured to generate and send emails for multiple email recipients on behalf of multiple email senders. For example, the email engine 405 may be configured to operate with a queue of email recipients and perform the email operations described with FIGS. 4 and 5 for each email recipient at a time. As another example, an interface associated with the email engine 405 may be used to generate an email, and an email name may be assigned to the email. The email name may then be placed into a queue, and the engine 405 may then be configured to process each email based on the email names in the queue.

When the email engine 405 determines that the sending of an email to an email recipient fails, the email engine 405 may generate an error notification and may continue with the next email recipient in the queue. For some implementations, when an email is sent successfully by the email engine 405, an event or successful notification may be generated with context of the sales cadence the email is associated with. This may enable the second sequence of the sales cadence to be performed. It may be noted that the first sequence of the sales cadence and the second sequence of the sales cadence may include operations performed by a computer system and participation or engagement by an email sender may be minimum.

Figure 6:
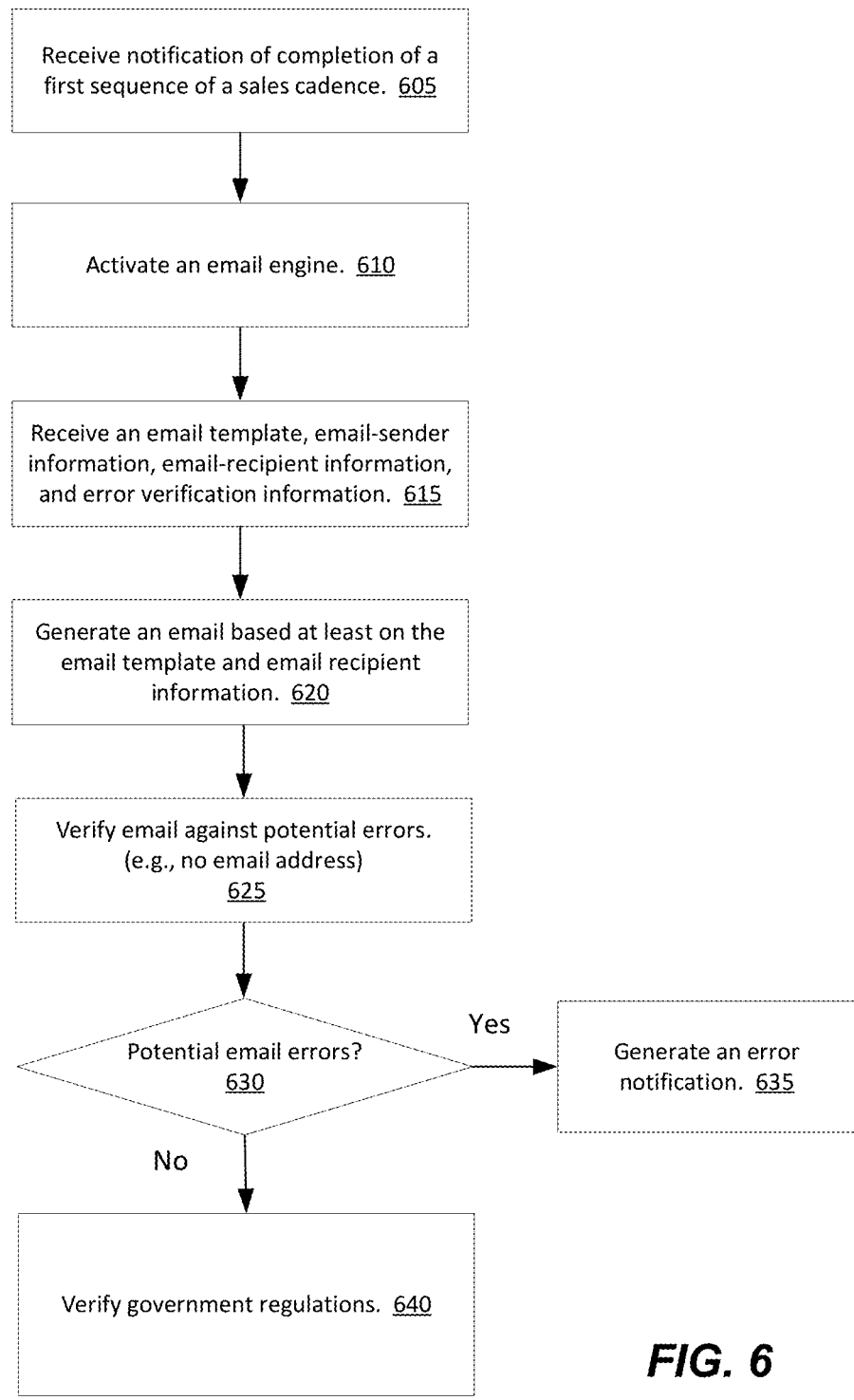
FIG. 6 is an example flow diagram of a process that may be performed by an email engine, in accordance with some implementations.

FIG. 6 is an example flow diagram of a process that may be performed by an email engine, in accordance with some implementations. The process shown in diagram 600 may be related to FIG. 4 and associated description. The process may be performed by an email engine such as the email engine 405.

At block 605, a notification of completion of a first sequence of a sales cadence may be received. The first sequence of the sales cadence may also be referred to as a first set of engagements. At block 610, the email engine 405 may be activated. As described above, the email engine 405 may be activated to operate on multiple emails for multiple email recipients.

At block 615, the email template, the information about the email recipient 418, the information about the email sender 412, and the error verification information 415 may be received. At block 620, the email engine 405 may use the information it receives to generate an email to be sent to the email recipient. At block 625, the email engine 405 may verify the email against potential email errors using the error verification information 415. For example, this may include verifying whether the email address of the email recipient is available. As another example, this may include verifying the email sender's limit. It may be noted that the potential errors verified by the operations of block 625 may be any procedure errors not related to government regulation described with FIG. 7. At block 630, when the email engine 405 determines that there is a potential error, an error notification may be generated, as shown in block 635. Alternative, the email engine 405 may proceed with verifying against government regulations, as shown in block 640.

Figure 7:
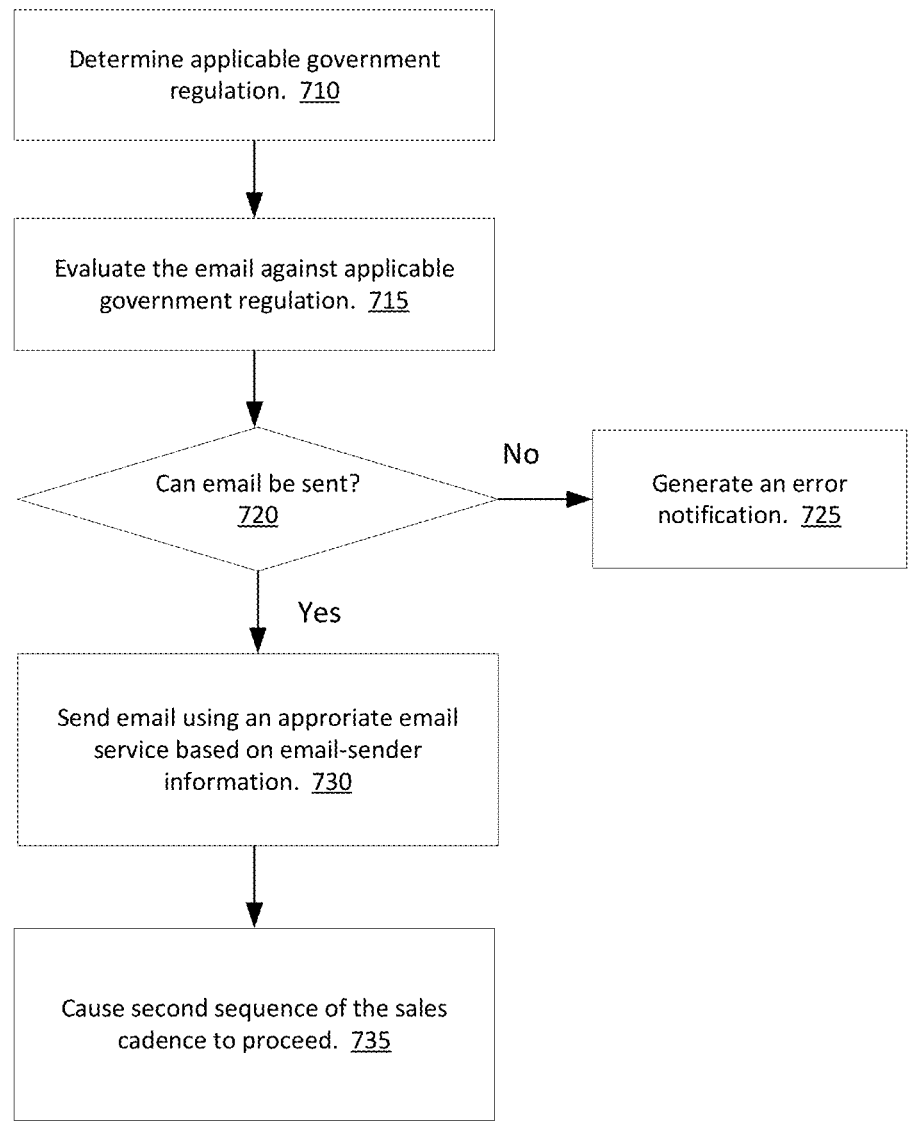
FIG. 7 is an example flow diagram of a process that may be performed by an email engine to stay in compliance with government regulation, in accordance with some implementations.

FIG. 7 is an example flow diagram of a process that may be performed by an email engine to stay in compliance with government regulation, in accordance with some implementations. The process shown in diagram 700 may be related to FIG. 5 and associated description. The process may be performed by an email engine such as the email engine 405. The process may be performed after receiving the notification of successful operations of a first sequence of a sales cadence and after an email has been generated by the email engine 405. The process may also be performed after verifying that there is no potential error as performed by block 625 of FIG. 6.

At block 710, the email engine 405 may determine applicable government regulation related to the email. This may include, for example, determining if the email recipient is located in a geographical area that is governed by the GDPR regulation, the PECR regulation or the CAN-SPAM regulation. At block 715, the email engine 405 may evaluate the email against the applicable government regulation. For example, when the email engine 405 detects that the email may be commercial in nature, the email engine 405 may cause the sending of the email to fail during the operation of block 720. Causing the sending of the email to fail may enable the email sender to review the email to ensure that requirements are met. For example, the requirements may include making sure that the unsubscribe option is clear and easy to use, and that the email is clearly marked as a commercial email. When the email engine 405 causes the sending of the email to fail, an error notification may be generated, as shown in block 725. This may enable the email sender to review and make appropriate correction to the email.

Alternatively, when the email engine 405 determines that the email may be sent, the email engine 405 may send the email using appropriate an email service based on the email-sender information, as shown in block 730 and as shown in Table 1. The email engine 405 may then cause the second sequence of the sales cadence to proceed, as shown in block 735. The second sequence of the sales cadence may also be referred to as a second set of engagements. For some implementations, the processes described in FIGS. 6 and 7 may be performed automatically upon receiving the successful notification of completion of the first sequence of a sales cadence.

Figure 8A:
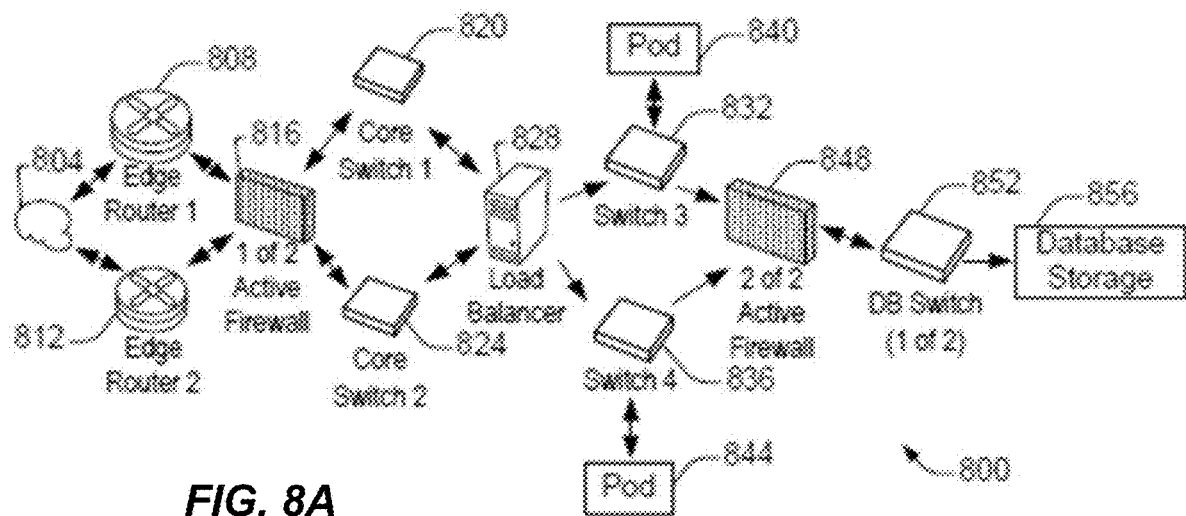
FIG. 8A shows a system diagram illustrating architectural components of an applicable environment, in accordance with some implementations.

FIG. 8A shows a system diagram 800 illustrating architectural components of an on-demand service environment, in accordance with some implementations. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand Services. Communication with the pods may be conducted via pod switches 832 and 836. Components of the on-demand service environment may communicate with a database storage system 856 via a database firewall 848 and a database switch 852.

Figure 8B:
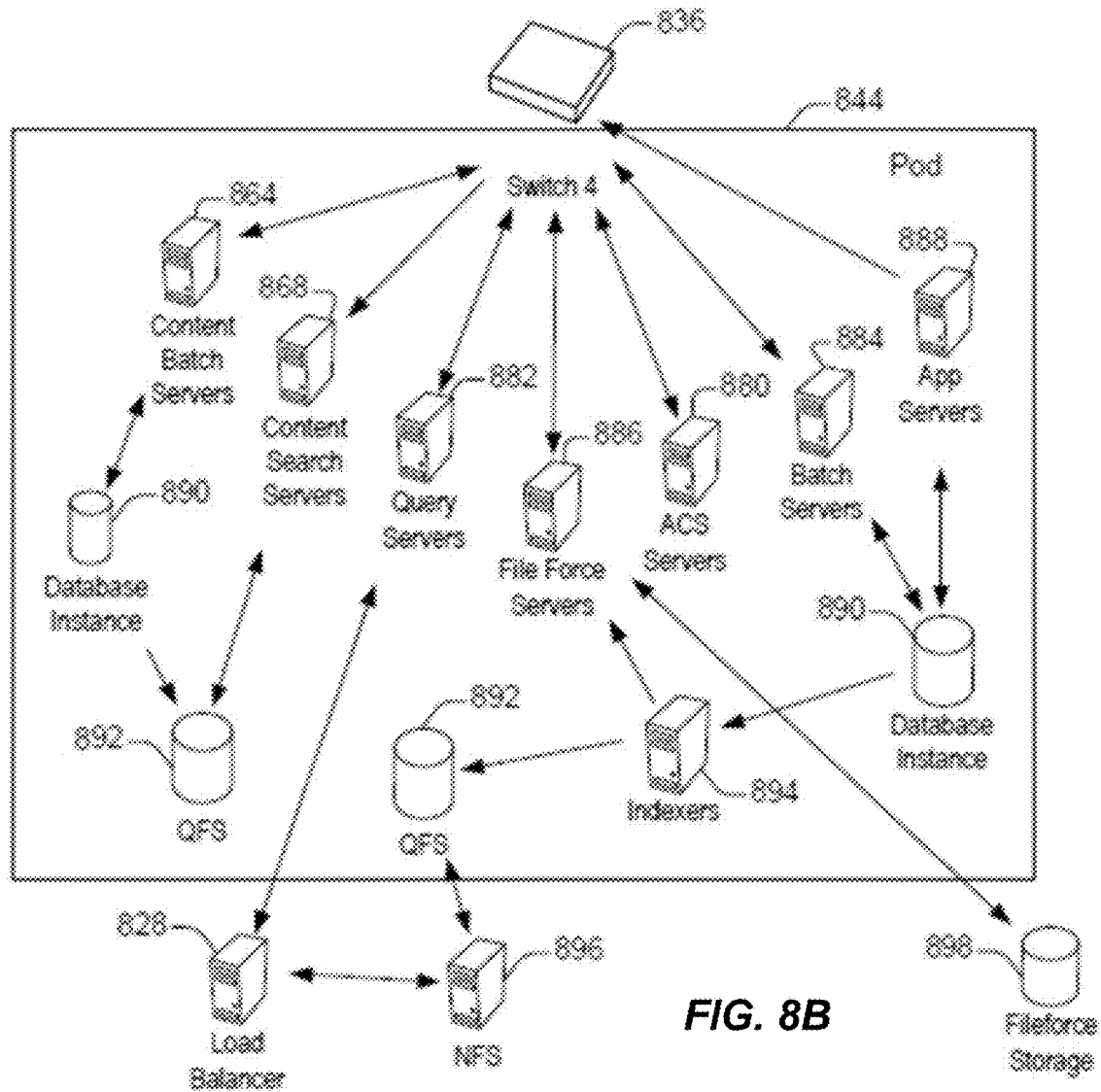
FIG. 8B shows a system diagram further illustrating architectural components of an applicable environment, in accordance with some implementations.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some implementations of an on-demand service environment may include anywhere from one to many devices of each type. Also, the on-demand service environment need not include each device shown in FIGS. 8A and 8B or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some implementations, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand service environment 800. The core switches 820 and 824 may be configured as network bridges that quickly route data between different components within the on-demand service environment. In some implementations, the use of two or more core switches 820 and 824 may provide redundancy and/or reduced latency.

In some implementations, the pods 840 and 844 may perform the core data processing and service functions provided by the on-demand service environment. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some implementations, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one implementation. The pod 844 may be used to render services to a user of the on-demand service environment 800. In some implementations, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may request internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs. For some implementations, the QFS 892 may be an open source file system available from Sun Microsystems® of Santa Clara, California. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some implementations, queries from the query servers 882 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without requiring an additional database call. In some implementations, database information may be transmitted to the indexer 894. Indexer 894 may provide an index of information available in the database 890 and/or QFS 892. The index information may be provided to Fileforce servers 886 and/or the QFS 892.

Figure 9:
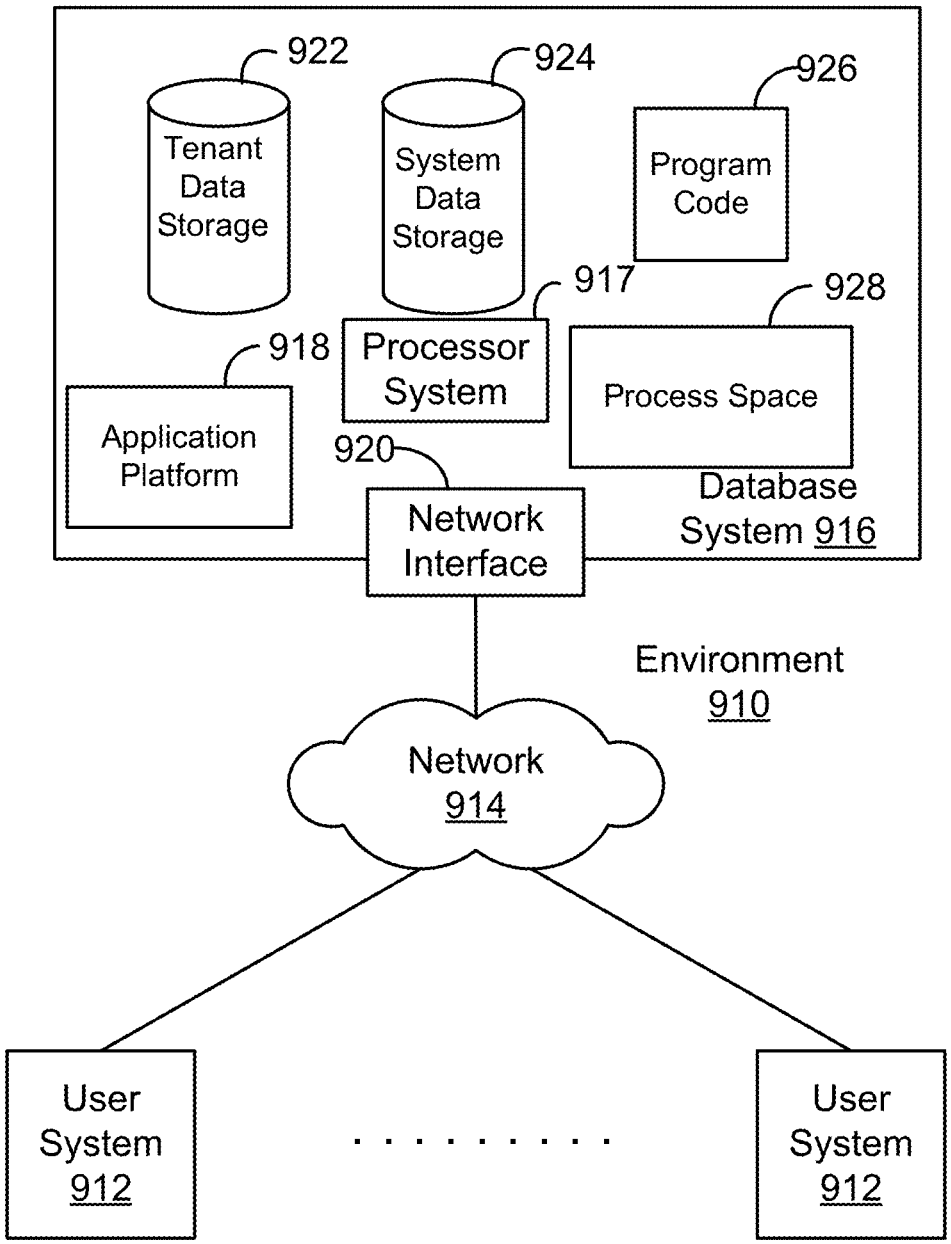
FIG. 9 shows a system diagram illustrating the architecture of a multi-tenant database environment, in accordance with some implementations.
Figure 10:
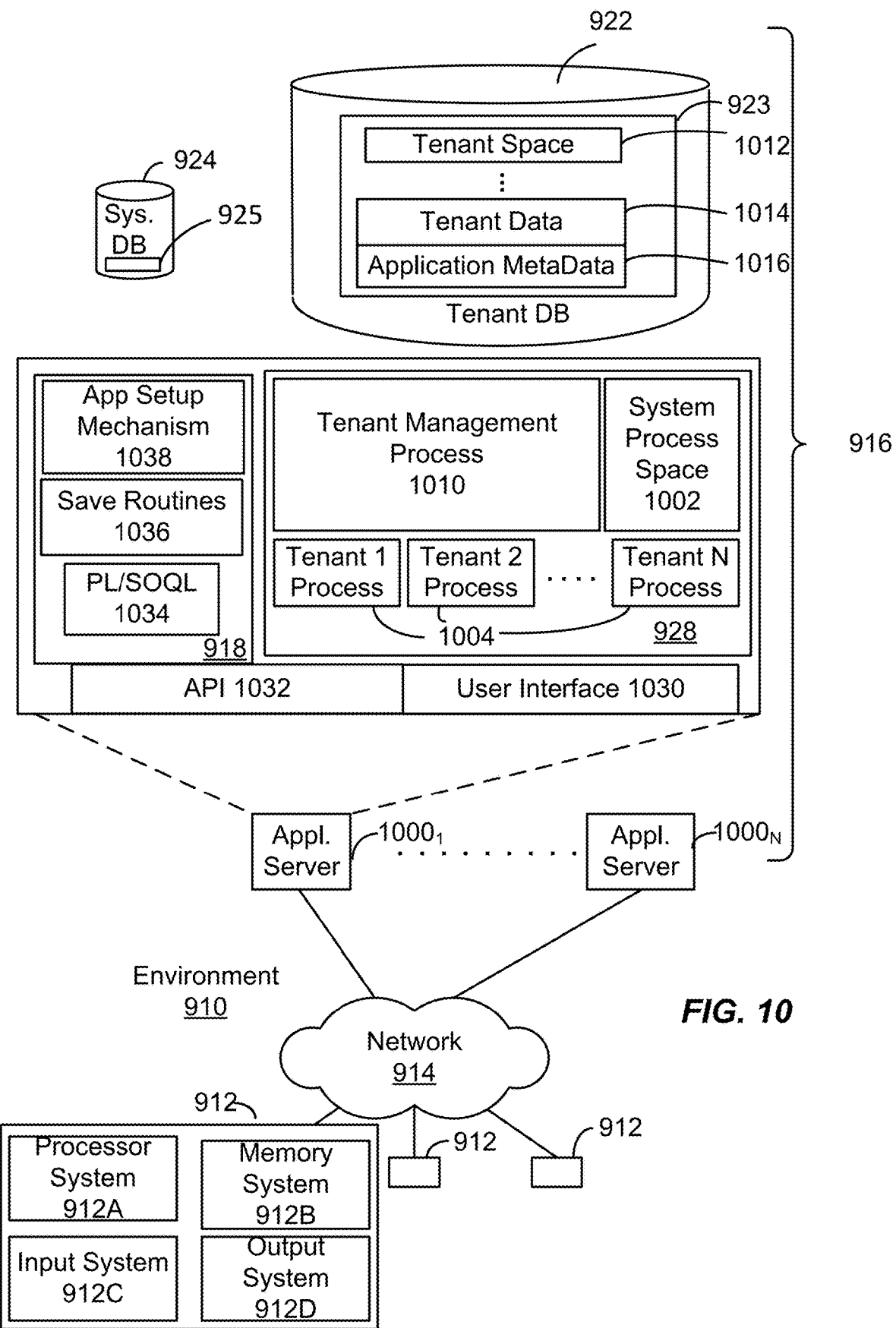
FIG. 10 shows a system diagram further illustrating the architecture of a multi-tenant database environment, in accordance with some implementations.

FIG. 9 shows a block diagram of an environment 910 wherein an on-demand database service might be used, in accordance with some implementations. Environment 910 includes an on-demand database service 916. User system 912 may be any machine or system that is used by a user to access a database user system. For example, any of user systems 912 can be a handheld computing system, a mobile phone, a laptop computer, a workstation, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 916, shown in FIG. 9, implements a web-based customer relationship management (CRM) system. For example, in some implementations, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some implementations. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some implementations, therefore, an interface system implementing a load balancing function (e.g., an F5 Big-IP load balancer) is communicably coupled between the application servers 1000 and the user systems 912 to distribute requests to the application servers 1000. In some implementations, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method comprising:
identifying one or more computer-implemented operations to be performed following an automatic email generation operation configured to generate and send emails to one or more email recipients; and
activating the automatic email generation operation, the automatic email generation operation configured to be successfully completed based on at least:
identifying one or more of a plurality of government regulations as being applicable to the emails,
identifying the one or more email recipients as being located in a geographical area governed by the applicable one or more government regulations,
determining that the emails are in compliance with the applicable one or more government regulations based on at least evaluating content of the emails, and
evaluating one or more email preference indications stored in one or more database records associated with the one or more email recipients;
the one or more computer-implemented operations configured to be:
enabled based on detecting successful completion of the automatic email generation operation, and
prevented based on detecting unsuccessful completion of the automatic email generation operation.

2. The method of claim 1, further comprising:
preventing a further one or more operations based on unsuccessful completion of the automatic email generation operation, the prevention being configurable to stop responsive to a notification that an error associated with the automatic email generation operation has been corrected.

3. The method of claim 1, wherein the automatic email generation operation is configured to be successfully completed further based on a set of parameters unique to an email recipient, and wherein violation of one or more parameters prevents the emails from being sent.

4. The method of claim 1, wherein the one or more government regulations relates to one or more of data protection, privacy and commercial emailing, and wherein violation of one or more government regulations prevents the emails from being sent.

5. The method of claim 1, further comprising:
configuring a plurality of computer-implemented operations to be performed in relation to a sequence of engagements, the computer-implemented operations including a first one or more non-email related operations to precede the automatic email generation operation and a second one or more operations to follow the automatic email generation operation.

6. The method of claim 5, wherein the first one or more operations and the second one or more operations are associated with a sales cadence.

7. The method of claim 1, wherein the generation of an email is based on receiving an email template and email-recipient information.

8. A system comprising:
a memory; and
one or more processors configurable to cause:

identifying one or more computer-implemented operations to be performed following an automatic email generation operation configured to generate and send emails to one or more email recipients; and activating the automatic email generation operation, the automatic email generation operation configured to be successfully completed based on at least:

identifying one or more of a plurality of government regulations as being applicable to the emails, identifying the one or more email recipients as being located in a geographical area governed by the applicable one or more government regulations, determining that the emails are in compliance with the applicable one or more government regulations based on at least evaluating content of the emails, and evaluating one or more email preference indications stored in one or more database records associated with the one or more email recipients;

the one or more computer-implemented operations configured to be:

enabled based on detecting successful completion of the automatic email generation operation, and prevented based on detecting unsuccessful completion of the automatic email generation operation.

9. The system of claim 8, the one or more processors further configurable to cause:

preventing a further one or more operations based on unsuccessful completion of the automatic email generation operation, the prevention being configurable to stop responsive to a notification that an error associated with the automatic email generation operation has been corrected.

10. The system of claim 8, wherein the automatic email generation operation is configured to be successfully completed further based on a set of parameters unique to an email recipient, and wherein violation of one or more parameters prevents the emails from being sent.

11. The system of claim 8, wherein the one or more government regulations relates to one or more of data protection, privacy and commercial emailing, and wherein violation of one or more government regulations prevents the emails from being sent.

12. The system of claim 8, the one or more processors further configurable to cause:

configuring a plurality of computer-implemented operations to be performed in relation to a sequence of engagements, the computer-implemented operations including a first one or more non-email related operations to precede the automatic email generation operation and a second one or more operations to follow the automatic email generation operation.

13. The system of claim 12, wherein the first one or more operations and the second one or more operations are associated with a sales cadence.

14. The system of claim 8, wherein the generation of an email is based on receiving an email template and email-recipient information.

15. A computer program product comprising a non-transitory computer-readable medium storing computer-readable program code executable by one or more processors, the program code including instructions configurable to cause:

identifying one or more computer-implemented operations to be performed following an automatic email generation operation configured to generate and send emails to one or more email recipients; and activating the automatic email generation operation, the automatic email generation operation configured to be successfully completed based on at least:

identifying one or more of a plurality of government regulations as being applicable to the emails, identifying the one or more email recipients as being located in a geographical area governed by the applicable one or more government regulations, determining that the emails are in compliance with the applicable one or more government regulations based on at least evaluating content of the emails, and evaluating one or more email preference indications stored in one or more database records associated with the one or more email recipients;

the one or more computer-implemented operations configured to be:

enabled based on detecting successful completion of the automatic email generation operation, and prevented based on detecting unsuccessful completion of the automatic email generation operation.

16. The computer program product of claim 15, the instructions further configurable to cause:

preventing a further one or more operations based on unsuccessful completion of the automatic email generation operation, the prevention being configurable to stop responsive to a notification that an error associated with the automatic email generation operation has been corrected.

17. The computer program product of claim 15, wherein the automatic email generation operation is configured to be successfully completed further based on a set of parameters unique to an email recipient, and wherein violation of one or more parameters prevents the emails from being sent.

18. The computer program product of claim 15, wherein the one or more government regulations relates to one or more of data protection, privacy and commercial emailing, and wherein violation of one or more government regulations prevents the emails from being sent.

19. The computer program product of claim 15, the instructions further configurable to cause:

configuring a plurality of computer-implemented operations to be performed in relation to a sequence of engagements, the computer-implemented operations including a first one or more non-email related operations to precede the automatic email generation operation and a second one or more operations to follow the automatic email generation operation.

20. The computer program product of claim 19, wherein the first one or more operations and the second one or more operations are associated with a sales cadence.

* * * * *